US006927861B2

(12) United States Patent
Zhou et al.

(10) Patent No.: US 6,927,861 B2
(45) Date of Patent: Aug. 9, 2005

(54) SIMPLE DETERMINISTIC METHOD FOR ARRAY BASED OPTICAL COMPONENT PACKAGING

(75) Inventors: Chuang Zhou, North Billerica, MA (US); Keith Kang, Hollis, NH (US)

(73) Assignee: Xanoptix, Inc., Merrimack, NH (US)

( * ) Notice: Subject to any disclaimer, the term of this patent is extended or adjusted under 35 U.S.C. 154(b) by 325 days.

(21) Appl. No.: 10/183,766

(22) Filed: Jun. 27, 2002

(65) Prior Publication Data

US 2003/0081904 A1 May 1, 2003

Related U.S. Application Data

(60) Provisional application No. 60/302,246, filed on Jun. 29, 2001.

(51) Int. Cl.[7] ............................................. H01L 21/30
(52) U.S. Cl. ...................... 356/508; 356/401; 356/400; 356/399; 385/52; 385/97; 250/559.3; 250/559.08; 250/559.13; 372/103; 156/292
(58) Field of Search ........................ 250/559.3, 559.08, 250/559.13; 356/401, 400; 372/103; 156/292

(56) References Cited

U.S. PATENT DOCUMENTS

| | | | |
|---|---|---|---|
| 5,042,709 A | 8/1991 | Cina et al. | |
| 5,077,821 A | 12/1991 | Makel et al. | |
| 5,093,879 A | 3/1992 | Bregman et al. | |
| 5,135,590 A | 8/1992 | Basavanhally et al. | |
| 5,281,301 A | 1/1994 | Basavanhally | |
| 5,416,872 A | 5/1995 | Sizer, II et al. | |
| 5,432,608 A * | 7/1995 | Komoriya et al. | 356/401 |
| 5,631,110 A * | 5/1997 | Shioiri et al. | 430/5 |
| 5,633,968 A | 5/1997 | Sheem | |
| 5,667,941 A * | 9/1997 | Okamoto et al. | 430/313 |
| 5,748,827 A * | 5/1998 | Holl et al. | 385/134 |
| 5,774,616 A | 6/1998 | Matsuda | |
| 5,936,342 A * | 8/1999 | Ono et al. | 313/495 |
| 6,074,888 A * | 6/2000 | Tran et al. | 438/39 |
| 6,095,697 A | 8/2000 | Lehman et al. | |
| 6,411,642 B1 * | 6/2002 | Mazed | 372/103 |
| 6,421,123 B1 * | 7/2002 | Shiraishi | 356/399 |
| 6,520,777 B2 * | 2/2003 | Cho et al. | 439/49 |
| 6,800,169 B2 * | 10/2004 | Liu et al. | 156/292 |
| 6,838,689 B1 * | 1/2005 | Deng et al. | 250/559.3 |
| 6,841,486 B2 * | 1/2005 | Boudreau et al. | 438/719 |
| 2002/0151181 A1 * | 10/2002 | Boudreau et al. | 438/710 |

FOREIGN PATENT DOCUMENTS

JP          362232924 A    * 10/1987  .......... H01L/21/30

OTHER PUBLICATIONS

International Search Report dated Oct. 17, 2002.

* cited by examiner

Primary Examiner—Viet Q. Nguyen
(74) Attorney, Agent, or Firm—Morgan & Finnegan LLP

(57) ABSTRACT

A method involves aligning each of two optical components to be joined relative to a common standard, removing the common standard, and joining each of two optical components to each other in alignment.

15 Claims, 5 Drawing Sheets

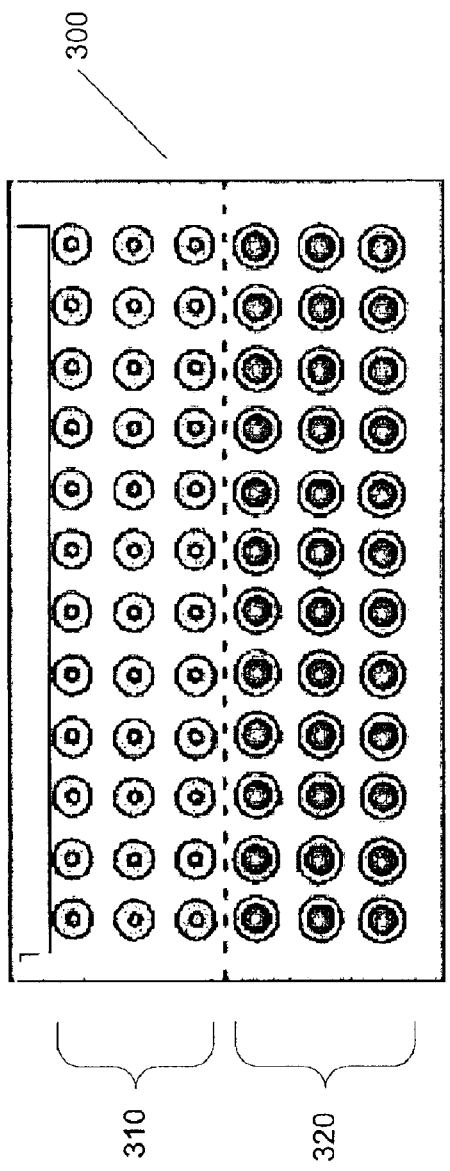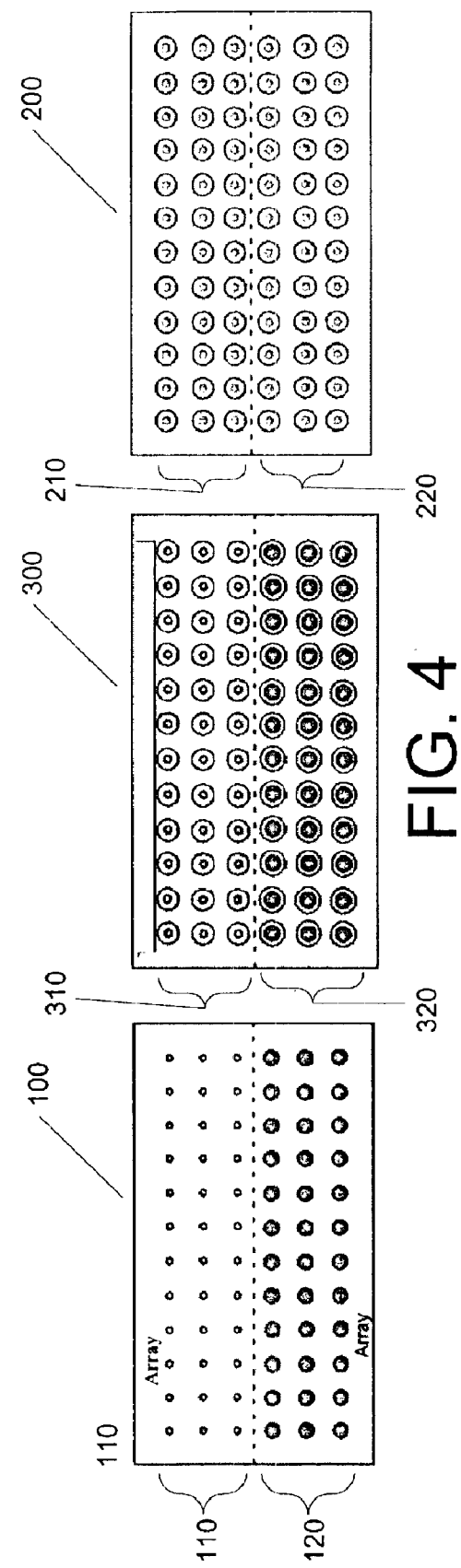

SIMPLE DETERMINISTIC METHOD FOR ARRAY BASED OPTICAL COMPONENT PACKAGING

CROSS REFERENCE TO RELATED APPLICATIONS

This application claims priority under 35 USC 119(e)(1) of U.S. Provisional Patent Application Ser. No. 60/302,246 filed Jun. 29, 2001.

FIELD OF THE INVENTION

This invention relates to packaging of optical components and, more particularly, to alignment of such components relative to other components.

BACKGROUND

People currently align connectors to modules but typically do it via either an active optical alignment scheme (where they emit light into or from individual devices) or use very small numbers of devices where an accurate pick & place machine can get integration alignment. For example, using one laser where there is no concern regarding rotational alignment.

The processes typically used for alignment of connectors requires the individual devices be illuminated and then the fiber(s) are scanned across the optical device with the output light from the end of the fiber monitored for the intensity of light output. This process is repeated and the fiber light output is continuously monitored as fibers are moved in several dimensions to allow accurate alignment. An example of this technique is described in, for example, IBM Micro News, Volume 6, Number 3, Third Quarter 2000.

Such techniques are costly, since requiring illuminating devices necessitates the use of significant capital equipment to power up each device, to monitor the output powers, etc. Moreover, because the techniques are active device techniques, they run the risk of damaging the devices.

SUMMARY

We have devised a passive technique for aligning a connector containing an array of optical fibers with an optical module containing an array of optical devices prior to attachment. Furthermore, these techniques can be used, but are not limited to, for the following alignments: aligning an array of optical fibers with another array of optical fibers; aligning an array of optical fibers with an optical chip; and aligning a micro-lens with an optical chip. These techniques are not limited to any particular optical devices, the devices could be lasers, cameras, detectors, modulators, microelectronic mechanical systems (MEMS) or other devices.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 3 shows an example photo mask standard for aligning the features of FIG. 1 with the features of FIG. 2;

FIG. 4 shows the photo mask of FIG. 3 relative to the images from FIGS. 1 and 2;

DETAILED DESCRIPTION

In the optical device fields, alignment of connector pieces onto modules is crucial to proper operation.

We have devised a simple, passive deterministic method toward alignment of components for array based transmitter, receiver or transceiver packaging.

Our approach uses an element having features common to each of the devices to be aligned as a central standard. Each of the devices can then be passively aligned to the standard which, in turn, causes the pieces to be in alignment relative to each other. As a result, the pieces will be aligned relative to each other when they are brought together.

The packaging alignment techniques allows the devices to be optimally coupled with an optical coupler.

Figure 1:
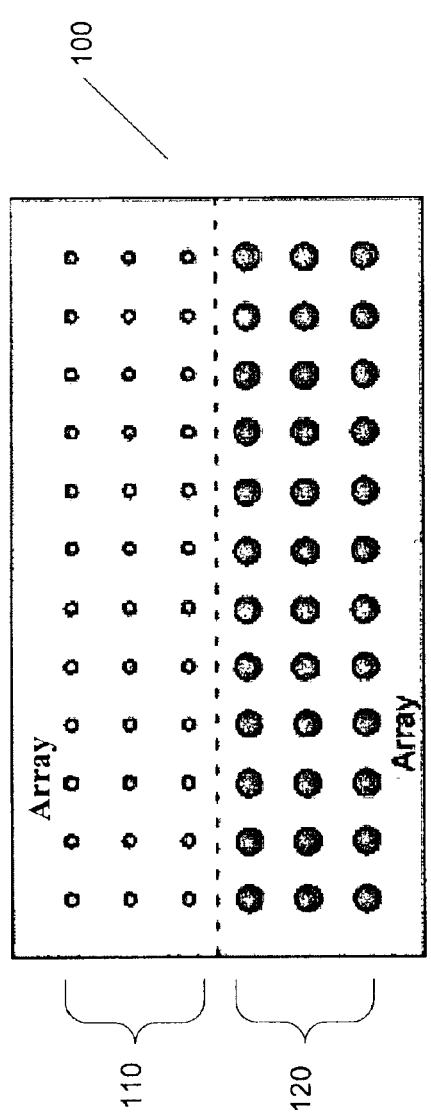
FIG. 1 shows example features of a chip array to be aligned with the features on an optical coupler.
Figure 2:
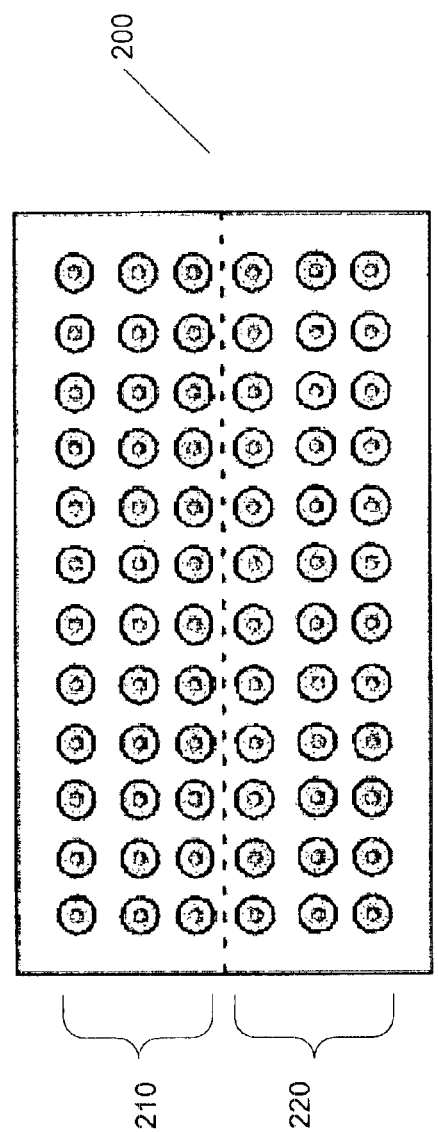
FIG. 2 shows example features on an optical coupler to be aligned with the features on the chip array of FIG. 1.

FIG. 1 shows example features, in this case lasers and detectors, that need to be aligned with the features on an optical coupler (shown in FIG. 2). Shown in FIG. 1 is a chip array 100. chip array 100 has a laser array 110 and a detector array 120. FIG. 2 illustrates an exemplary optical coupler 200. Optical coupler 200 has feature array 210 that match with the laser array 110, and feature array 220 that match with detector array 120.

As shown in FIG. 3, the approach creates a photo mask consisting of a properly aligned superposition of the two sets of features to be aligned. An example photo mask 300 for the features of FIGS. 1 and 2 is shown in FIG. 3. Namely, set 310 having feature array 210 superimposed with the laser array 110, and set 320 having feature array 220 superimposed with detector array 120.

FIG. 4 shows the photo mask 300 placed between the two images from FIGS. 1 and 2, namely chip array 100 and optical coupler 200 where it can be readily seen that both items features are contained on the photo mask in proper alignment.

This photo mask 300 thus serves as the alignment standard. By comparing the Photo Mask 300 with the actual devices and the optical coupler the offset between each device and the corresponding optical couplers can be visually determined at once with high accuracy. Therefore, without actually turning devices on, the loss figures of the optical path can be determined. In addition, alignment using the mask may be accomplished utilizing one or both sides of the photo mask 300.

In overview, the actual alignment process proceeds as follows using high accuracy, low back-lash XYZ stages, with continuing reference to FIG. 5.

Figure 5:
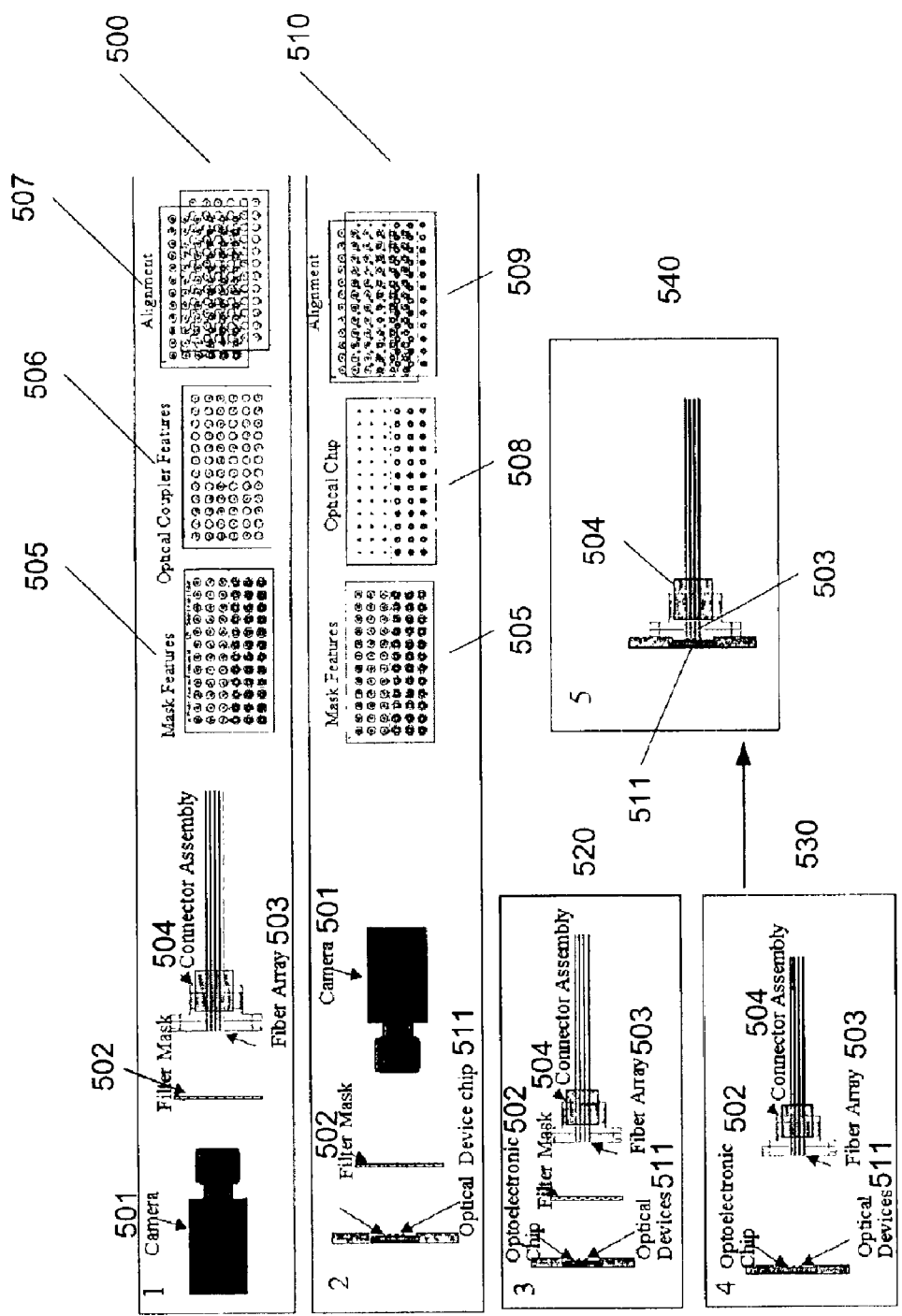
FIG. 5 illustrate the steps involved in the alignment process.

Shown in FIG. 5 is an exemplary method of alignment. It is understood that these individual steps may be done in any order and/or may delete or add steps of the method depending on the implementation desired Shown in block 500 is the alignment process of a connector assembly or optical coupler chip 504 with a photo mask 502 utilizing a camera 501. Shown in block 510 is the alignment process of an optical device chip with a photo mask 502 utilizing camera 501. These alignments may be done individually or at the same time depending on the implementation. The camera 501 may be replaced with a laser, microlens, or any other device that can be used in the assistance of aligning the optical device chip 511 with the fixed mask 502.

In one example, the device chip 511 is held on one end of a stage and a coupler or connector assembly 504 to which the devices are to be aligned is held in the other end of the stage. The mask 502 is placed in between in a position that will remain fixed throughout the alignment process or, in certain variants, can be removed and replaced with high accuracy.

The device chip 511 is then viewed through the mask using a zooming viewing scope or camera or any other device that can be used in alignment procedures. The device chip 511 is then moved out of the way using the XYZ stage, so that it can be accurately replaced later. After that the optical coupler chip 504 having a fiber array 503 is aligned in a similar manner with the fixed mask 502 using a zooming viewing scope from the other side. Again, the mask can be utilized on one or both sides. Depending on the implementation, the order of alignment may be reversed as shown in FIG. 5. Shown in FIG. 5 is the optical coupler or connector assembly 504 being aligned with mask 502 prior to alignment of device chip 511. Again either one side or both sides of the mask can be used in this alignment process as well as alignment at the same time or individually, as shown in block 500 and block 510. Shown in block 500 is mask feature 505 and optical coupler feature 506 that are brought into an alignment position 507. Shown in block 510 is mask feature 505 and optical device chip feature 508 that are brought into an alignment position 509. Block 520 illustrates alignment of the optical device chip 511 with optical coupler chip 504. Again, any optical component may utilize this technique of alignment. For example, the optical components given in this description as examples, specifically aligning a connector containing an array of optical fibers with an optical module containing an array of optical devices prior to attachment, may readily be replaced with aligning an array of optical fibers with another array of optical fibers; aligning an array of optical fibers with an optical chip; and aligning a micro-lens with an optical chip.

The photo mask 502 is then removed as shown in block 530 and, optionally, depending upon the separation distance between the two, the device chip 511 is moved away from the optical coupler 504.

The device is then axially adjusted relative to the optical coupler position to optimize the coupling efficiency. This adjustment and coupling is shown in block 540.

Advantageously, it should thus be recognized that the whole process is simple and deterministic.

Moreover, by using a simple deterministic approach, transceiver packaging cost and complexity is reduced.

In particular, the approach proceeds as follows.

A filter mask, which contains features, which resemble both the optical fiber array and the optical device array, is created or, if previously created, attached to the center of the XYZ stage. In the example in FIGS. 1–3 above, the optical device array contains both lasers and detectors (though it could contain a myriad of other devices), which have different sizes and orientations. The fiber array has yet a third size and shape in this example. Thus, the filter mask has all three of those features on it to act as an absolute positioning standard to which all of the pieced can be aligned.

The mask has a series of elements, which correspond to the elements on both the optical fiber array (also known as the optical coupler) and to the optical chip array (i.e. the laser and detector arrays).

Once the mask standard is positioned, alignment can begin.

The optical chip array and optical fiber array/connector assembly are mounted on a high precision, reproducible, low-backlash stage. The optical chip array is then moved away to accommodate a camera or, if there is enough space, the camera is merely interposed between the optical chip array and the standard.

The optical fiber array is then brought close to the mask and the camera is used to look through the mask at the optical fiber array.

The fiber array/connector assembly is moved around in a plane parallel to the mask, as well as for roll, pitch and yaw, until the fiber elements align to the corresponding elements on the filter mask as observed using the camera. Once alignment is achieved, the position of the fiber array/connector assembly is noted.

The fiber array/connector assembly is then moved aside on a high precision, reproducible, low-backlash stage (so that later it can be repositioned to its previously noted position above). The optical chip assembly is then positioned near the filter mask. As was done for the optical fiber array, a camera is then brought in and used to look through the mask at the optical device chip. The optical device chip assembly is then moved around in a plane parallel to the mask, as well as for roll, pitch and yaw, until the optical elements on the chip align to the corresponding elements on the mask standard as observed using the camera.

Once alignment is achieved, the position of the optical chip assembly is optionally noted.

It should be appreciated that, although the alignment was described in a particular order, the chip array could have been aligned first. Alternatively, the first component could be aligned to the standard before the second component is even mounted.

In any case, once the two have each been aligned relative to the mask standard, the camera is moved aside and the fiber array/connector assembly is repositioned to its aligned location. At this point, the optical device assembly and the fiber array/connector assembly are aligned accurately in 'X', 'Y', and Rotational dimensions as well as in tilt.

Next, the filter element is moved aside from the central region between the fiber array/connector assembly and the optical chip assembly.

The two aligned pieces are then brought together in the 'Z' dimension until they are in contact and secured together.

Figure 6:
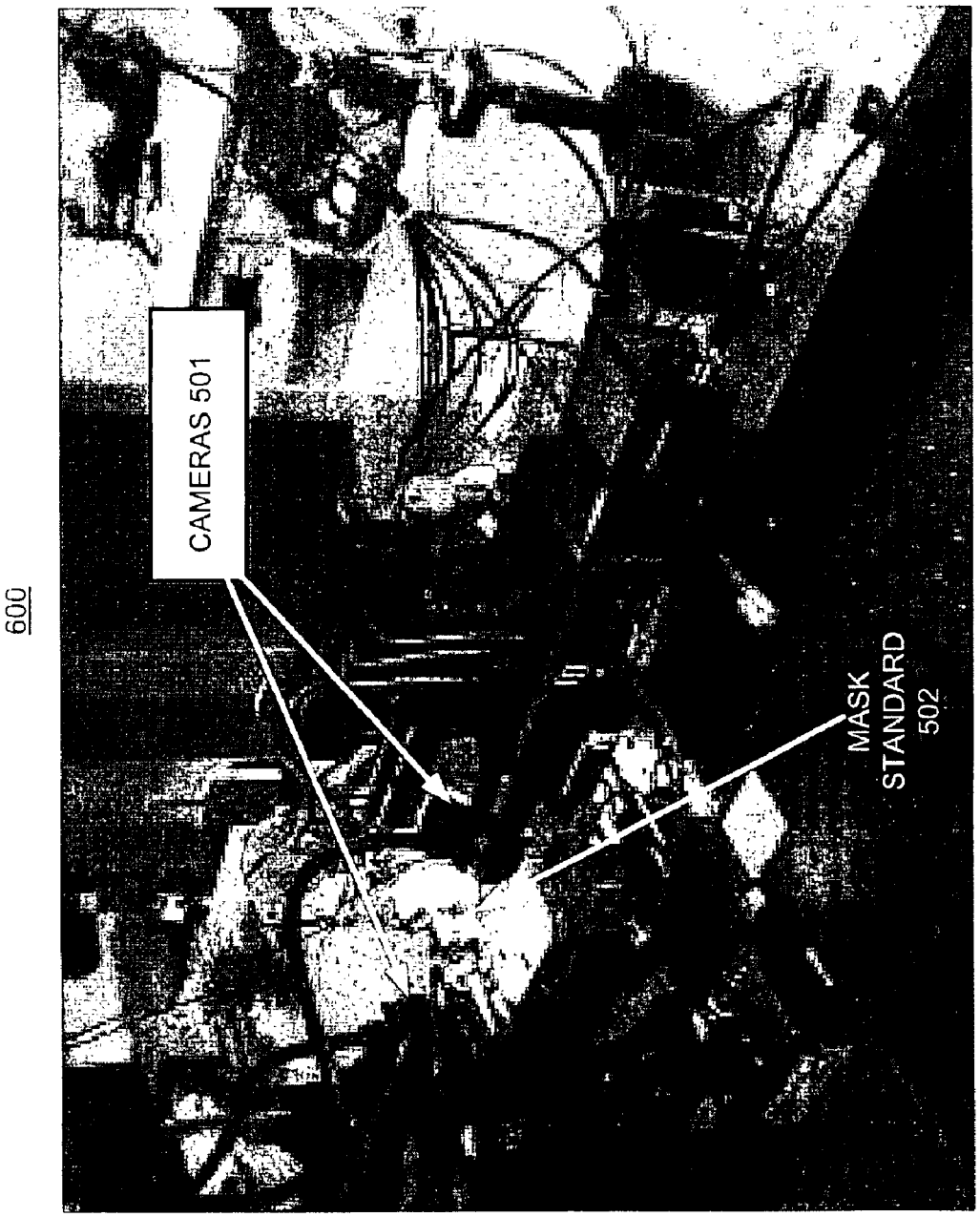
FIG. 6 is a photograph of an alignment apparatus constructed for operation in accordance with the invention.

FIG. 6 is a photograph of an assembly station 600 used for the alignment process described herein. Through use of this station to align various pieces including fiber bundles, optical chips and connector assemblies, we have achieved an accuracy of, as low as, 20 nanometers of tolerance.

In other alternative variants, the same approach can be used with a single camera so long as the camera can be accurately and reproducibly be moved from one position to another.

In still other alternative variants, another device, such as a laser, a photodetector (detector) a non-coherent light source, etc. can be used in place of the camera as the device used to check alignment between a given component and the standard, such as the photo mask.

Figure 7A:
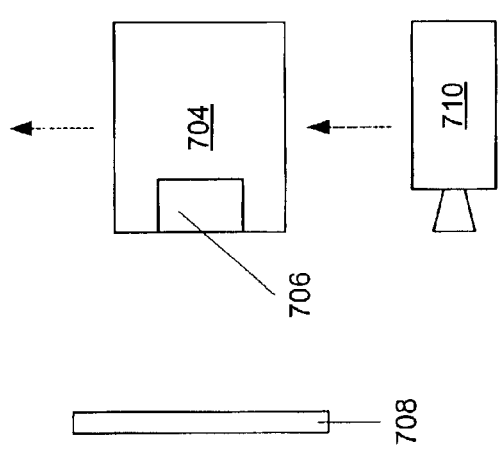
FIGS. 7A and 7B show, in generic form, alternative arrangements constructed for operation in accordance with the invention
Figure 7B:
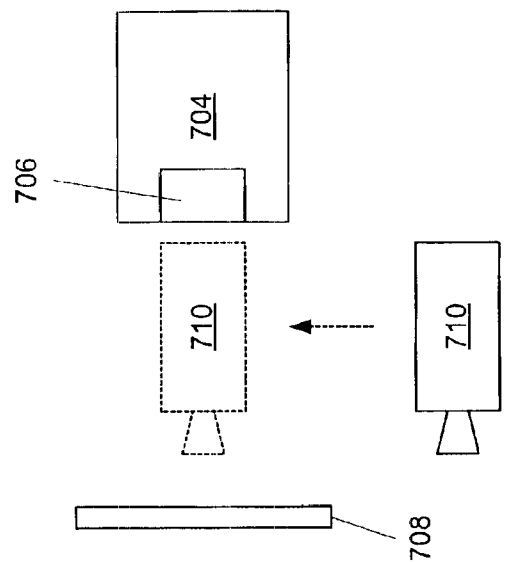

FIG. 7A shows, in generic form, such an arrangement. One of the components 700 to be aligned is mounted on a moveable high precision stage 702. Another of the components 704 to be aligned is also mounted on a moveable high precision stage 706. The standard 708 is located between the two components 700, 704. As shown in FIG. 7A, the arrangement is constructed so that at least one of the components to be aligned is moved out of the way so that the device 710 that is used to check alignment of the other component can be moved in its place. Alternatively, for example as shown in FIG. 7B, if spacing permits, the device 710 can be interposed between the standard 708 and a component to be aligned. The alignment then proceeds as described herein, first for that component and then for the other component.

It is to be understood that these techniques are not limited to alignment of any particular optical devices or combinations thereof, the devices could be lasers, cameras, detectors, modulators, micro-electronic mechanical systems (MEMS) or other devices.

In summary, by using a passive deterministic approach to alignment advantages not present in the prior art can be achieved. For example, by not illuminating the individual devices, we can perform alignment 1) more quickly, and 2) with lower cost of capital equipment for each assembly station.

By making a purely passive system, the cost of capital equipment is minimal (essentially the cost of the translation stages and camera(s), lasers or other optical devices used in the alignment process. In addition, setup and insertion of the module components to prepare for alignment can also occur much more rapidly when module components are passively aligned than when they are actively aligned, thereby reducing labor costs.

It should therefore be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention and others are equivalent.

What is claimed is:

1. A method for aligning optical components, comprising:
    positioning, at a central region between a first optical component and a second optical component, a filter mask of the type having an image of at least one feature of the first optical component and at least one feature of the second optical component.
    observing, through the photo mask using an observation device, at least one of the features of one of the first or second optical components; and
    aligning the feature of the mask with the feature of the one of the optical components to bring the one of the optical components into alignment with an other of the optical components that was previously aligned relative to the mask.

2. The method of claim 1, wherein the feature of the first optical component is a fiber array and feature of the second optical component is an optical device array.

3. The method of claim 1, wherein the optical device array further includes at least one of a laser, a detector, a camera, a modulator, or a micro-electronic mechanical systems (MEMS) device.

4. The method of claim 1, wherein the positioning comprises attaching the filter mask to the center of a XYZ stage.

5. The method of claim 1, wherein the features of the first and the second optical components have different sizes and orientations.

6. The method of claim 1, further comprising mounting the first and the second optical components on a high precision, reproducible, low-backlash stage.

7. The method of claim 1, further comprising moving away either the first optical component or the second optical component to accommodate the observation device.

8. The method of claim 1, further comprising interposing between the first and the second optical components the observation device.

9. The method of claim 1, wherein the observation device is a camera.

10. The method of claim 1, further comprising positioning the first and the second optical components in alignment.

11. The method of claim 1, wherein the aligning comprises aligning the photo mask with the first optical component and then aligning the mask with the second optical component.

12. The method of claim 11, further comprising moving the observation device aside once the first and the second optical components have each been aligned relative to the photo mask.

13. The method of claim 11, further comprising securing the first and the second optical components together.

14. The method of claim 1 wherein the aligning between the first and the second optical components is within about 20 nanometers of tolerance.

15. A method for aligning optical components, comprising:
    positioning a mask on an alignment apparatus, at a central region between a connector containing an array of optical fibers and an optical module containing an array of optical devices, prior to attachment of the connector and the optical module, the mask having features that resemble both the array of optical fibers and the array of optical devices;
    aligning one of array of optical fibers or the array of optical devices relative to the mask; and
    aligning the other of the array of optical fibers or the array of devices relative to the mask as to create an alignment between the connector and optical module without powering the optical devices.

* * * * *